United States Patent Office 3,823,108
Patented July 9, 1974

3,823,108
AQUEOUS ETHYLENE TERPOLYMER HYDROSOL DISPERSIONS
Thomas Charles Bissot, Newark, Del., assignor to E. I. du Pont de Nemours and Company, Wilmington, Del.
No Drawing. Filed Oct. 30, 1972, Ser. No. 301,851
Int. Cl. C09j 3/26
U.S. Cl. 260—27 R                17 Claims

ABSTRACT OF THE DISCLOSURE

Aqueous ethylene terpolymer hydrosol dispersions are described which are useful as heat-seal coatings, laminating adhesives and as primers. These dispersions comprise (1) an ethylene terpolymer consisting essentially of about 55 to 80 weight percent ethylene, about 10 to 42 weight percent ester monomer, and about 3 to 10 weight percent alpha, beta-ethylenically unsaturated carboxylic acid in which at least about 50 percent of the acid groups are neutralized, (2) about 5 to 50 weight percent, based on the ethylene terpolymer, of a high molecular weight acid selected from the group consisting of rosins and fatty acids and having an acid number of at least about 50, (3) an alkali metal hydroxide in an amount sufficient to neutralize about 10 to 100 percent of the acid groups in both the ethylene terpolymer and the high molecular weight acid, and (4) an amine base having a dissociation constant of at least about $1 \times 10^{-8}$ in an amount sufficient to neutralize 0 to about 300 percent of the acid groups in both the ethylene terpolymer and the high molecular weight acid, the total amount of alkali metal hydroxide and amine base being sufficient to neutralize at least about 50 percent of the acid groups in both the ethylene terpolymer and the high molecular weight acid, said dispersion having a solids content of about 2 to 35 percent by weight.

BACKGROUND OF THE INVENTION

(1) Field of the Invention

This invention relates to ethylene terpolymer hydrosols containing ethylene, an ester monomer, and an alpha, beta-ethylenically unsaturated carboxylic acid and to their use as coatings, adhesives and primers.

(2) Description of the Prior Art

Aqueous dispersions and emulsions of ethylene copolymers and terpolymers are well known in the art. Such dispersions can be prepared by emulsion polymerization or by post-dispersion techniques. Because of the low capacity of emulsion polymerization equipment when preparing high ethylene content copolymers, it is generally preferred to prepare these polymers by bulk or solution polymerization followed by post-dispersion of the polymer in water. A suitable post-dispersion technique involving the use of a solvent is described by Funck and Wolff in U.S. Pat. 3,296,172. By this process the polymer is dissolved in a water-immiscible solvent and then the polymer solution is emulsified in water using a suitable emulsifying agent. Thereafter, the solvent is evaporated and the polymer remains as an aqueous dispersion. In my U.S. Pat. 3,487,036 I describe the use of a dimerized wood rosin soap as the emulsifying agent in this post-dispersion technique.

In recent years there has been much investigation of more economical direct methods of preparing ethylene copolymer and terpolymer dispersions. In U.S. Pat. 3,677,989 Jenkinson describes a method of preparing clear, stable emulsions of certain ethylene/acrylic acid copolymers and terpolymers by direct dispersion techniques, not involving the use of a solvent. In this process the ethylene/acrylic acid polymer is mixed with a water-soluble base in water and heated to 150–200° C. with stirring. Additional water is then added and stirring is continued until a clear, stable emulsion is formed. Because of the high temperatures involved in this process, high pressure equipment must be used which detracts from the economics. Moreover, it is well known that, in the case of an ethylene terpolymer containing as much as about 10 percent ester monomer, substantial hydrolysis of the ester group would occur in the presence of water under the alkaline and high temperature conditions of the Jenkinson process.

SUMMARY OF THE INVENTION

I have now discovered aqueous ethylene terpolymer hydrosol dispersions which comprise (1) an ethylene terpolymer consisting essentially of about 55 to 80 weight percent ethylene, about 10 to 42 weight percent ester monomer, and about 3 to 10 weight percent alpha, beta-ethylenically unsaturated carboxylic acid in which at least about 50 percent of the acid groups are neutralized, (2) about 5 to 50 weight percent, based on the ethylene terpolymer, high molecular weight acid selected from the group consisting of rosins and fatty acids and having an acid number of at least about 50, (3) alkali metal hydroxide in an amount sufficient to neutralize about 10 to 100 percent of the acid groups in both the ethylene terpolymer and the high molecular weight acid, and (4) amine base having a dissociation constant of at least about $1 \times 10^{-8}$ in an amount sufficient to neutralize 0 to about 300 percent of the acid groups in both the ethylene terpolymer and the high molecular weight acid, the total amount of alkali metal hydroxide and amine base being sufficient to neutralize at least about 50 percent of the acid groups in both the ethylene terpolymer and the high molecular weight acid, said dispersion having a solids content of about 2 to 35 percent by weight.

These aqueous ethylene terpolymer hydrosol dispersions are prepared by an economical direct dispersion process which comprises (A) mixing (1) an ethylene terpolymer consisting of about 55 to 80 weight percent ethylene, about 10 to 42 weight percent ester monomer, and about 3 to 10 weight percent alpha, beta-ethylenically unsaturated carboxylic acid in which at least about 50 percent of the acid groups are neutralized, (2) about 5 to 50 weight percent, based on the ethylene terpolymer, high molecular weight acid selected from the group consisting of rosins and fatty acids and having an acid number of at least about 50, (3) alkali metal hydroxide in an amount sufficient to neutralize about 10 to 100 percent of the acid groups in both the ethylene terpolymer and the high molecular weight acid, and (4) amine base having a dissociation constant of at least about $1 \times 10^{-8}$ in an amount sufficient to neutralize 0 to about 300 percent of the acid groups in both the ethylene terpolymer and the high molecular weight acid, the total amount of alkali metal hydroxide and amine base being sufficient to neutralize at least about 50 percent of the acid groups in both the ethylene terpolymer and the high molecular weight acid, and (5) water in an amount sufficient to provide a solids content of about 2 to 35 percent by weight, and (B) heating this mixture at a temperature of about 55 to 140° C. with agitation for a period of time sufficient to convert the mixture to an aqueous hydrosol dispersion.

DETAILED DESCRIPTION OF THE INVENTION

In accordance with the process of the present invention, it is possible to prepare for the first time aqueous dispersions of ethylene terpolymers containing at least about 10 percent ester monomer by economical direct dispersion techniques, that is, without the aid of a volatile solvent. The use of a high molecular weight acid and relatively mild temperatures are essential features of the process of this invention.

I refer to the products obtained in accordance with this invention as "aqueous hydrosol dispersions." These dispersions are characterized generally by a transparent or translucent bluish color and contain particles which are so small that they are not readily detected by an optical microscope. These particles are discernible, however, with a high resolution electron microscope and are believed to be in the range of about 0.01 to 0.08 micron. Previous dispersions of these ethylene terpolymers, such as those described in my aforementioned patent are characterized by a white or milky color and contain particles having an average size between about 0.25 and about 1.0 micron which are detectable with a high powered optical microscope.

The terpolymers used in accordance with this invention consist essentially of ethylene, an ester monomer, and an alpha, beta-ethylenically unsaturated carboxylic acid. The term "consisting essentially of," as used herein, is meant to include only those unspecified ingredients or impurities which do not materially alter or detract from the basic and novel characteristics of the terpolymers used in accordance with this invention. In other words, this term excludes unspecified monomers in amounts which prevent the advantages of this invention from being realized. The terpolymer should contain about 55 to 80 percent by weight of ethylene and preferably about 65 to 75 percent ethylene.

The terpolymers described herein should contain about 10 to 42 percent by weight of an ester monomer. Examples of suitable ethylenically unsaturated organic esters include vinyl esters of lower ($C_1$ to $C_6$) saturated aliphatic monocarboxylic acids such as vinyl formate, vinyl acetate, vinyl propionate, vinyl butyrate, and vinyl isobutyrate; allyl esters of lower ($C_1$ to $C_6$) saturated aliphatic monocarboxylic acids such as allyl formate, allyl acetate, allyl propionate and allyl isobutyrate; lower ($C_1$ to $C_6$) alkyl esters of acrylic and methacrylic acids, such as methyl, ethyl, propyl, isopropyl, butyl, isobutyl, amyl and hexyl acrylates and methacrylates; di-lower ($C_1$ to $C_6$)-alkyl esters of ethylenically unsaturated dicarboxylic acids such as dialkyl maleates and fumarates; and the like. Vinyl acetate is the preferred ester monomer. Preferably, the ester monomer is present in the amount of about 15 to 30 percent by weight.

The ethylene terpolymer should contain about 3 to 10 percent by weight of an alpha, beta-(ethylenically unsaturated carboxylic acid. Examples of suitable acids include acrylic acid, methacrylic acid, crotonic acid, fumaric acid, maleic acid, itaconic acid, aconitic acid, maleic anhydride, itaconic anhydride, alkyl hydrogen maleates, alkyl hydrogen fumarates, and the like. Acrylic and methacrylic acids are preferred. The preferred amount of acid in the terpolymer is about 5 to 10 percent by weight.

The ethylene terpolymers used in accordance with this invention are prepared by techniques which are well known to those skilled in the art. These terpolymers are generally prepared by high-pressure, free-radical catalyzed processes, but terpolymers prepared by low pressue corodination catalyzed processes are also suitable. A suitable method of preparing these terpolymers is described by Beresniewicz and Simms in U.S. Pat. 2,703,794. Preferably, the terpolymers are prepared by bulk polymerization.

The molecular weight of the ethylene terpolymers can be varied over a wide range. Preferably, the terpolymer has a molecular weight corresponding to a melt index of about 3 to 150. The terpolymer melt index is determined by method D–1238–70 of the American Society for Testing Materials.

The dispersions of this invention should contain about 5 to 50 percent by weight, based on the ethylene terpolymer, of a high molecular weight acid selected from the group consisting of rosins and fatty acids and having an acid number of at least about 50. The term "rosins" is intended to cover the resinous materials that occur naturally in the oleoresin of pine trees or are obtained from tall oil produced as a by-product in the kraft paper industry. This term is also intended to include modified rosins which have been chemically treated such as by hydrogenation, dehydrogenation, or polymerization. Rosins are complex mixtures composed mainly of resin acids. These materials are fully described in the Kirk-Othmer *Encyclopedia of Chemical Technology*, Second Edition, Volume 17, Pages 475 to 505, 1966, Interscience Publishers. A particularly preferred rosin is dimerized wood rosin.

Fatty acids are also suitable high molecular weight acids for use in preparing the aqueous hydrosol dispersions of this invention. Suitable fatty acids include lauric, myristic, pentadecanoic, palmitic, margaric, stearic, myristoleic, palmitoleic, oleic, linoleic, linolenic, and mixtures thereof. The preferred high molecular weight acids are the rosins because they contribute to the adhesive properties of the resulting product. Preferably, the high molecular weight acid is present in the amount of 20 to 30 percent by weight based on the ethylene terpolymer.

The hydrosol dispersion of this invention should contain an alkali metal hydroxide in an amount sufficient to neutralize about 10 to 100 percent of the acid groups in both the ethylene terpolymer and the high molecular weight acid. Suitable alkali metal hydroxides include sodium, potassium and lithium hydroxides. Preferably, the alkali metal hydroxide is present in an amount sufficient to neutralize about 25 to 60 percent of the acid groups in both the ethylene terpolymer and the high molecular weight acid.

The hydrosol dispersions of this invention may optionally contain an amine base having a dissociation constant of at least about $1 \times 10^{-8}$ in an amount sufficient to neutralize 0 to about 300 percent of the acid groups in both the ethylene terpolymer and the high molecular weight acid. Suitable examples of such amines include ammonia; primary, secondary and tertiary, mono-, di- and triamine derivatives of $C_1$ to $C_6$ alkanes such as methylamine, ethylamine, isopropylamine, tert.-butyl-amine, diethylamine, triethylamine, ethylene diamine, and diethylene triamine; alkanol amines such as monoethanol amine, diethanol amine, and triethanol amine; morpholine, and the like. In all cases, the total amount of alkali metal hydroxide and amine base should be sufficient to neutralize at least about 50 percent of the acid groups in both the ethylene terpolymer and the high molecular weight acid. Preferably, the total amount of these bases is sufficient to neutralize at least about 60 percent of the acid groups in both the ethylene terpolymer and the high molecular weight acid.

The aqueous ethylene terpolymer hydrosol dispersions of this invention are prepared by mixing the ethylene terpolymer, the high molecular weight acid, the alkali metal hydroxide, and, optionally, the amine base with water in an amount sufficient to provide a solids content of about 2 to 35 percent by weight and heating this mixture with agitation at a temperature of about 55 to 140° C. for a period of time sufficient to convert the mixture to an aqueous hydrosol dispersion. Most commonly, the contents are heated with mild agitation to a temperature of about 65 to 100° C., and preferably about 80 to 95° C., for a period of about 15 minutes to about 4 hours. The use of temperatures above about 140° C. leads to degradation of the polymer and requires the use of high pressure equipment which increases costs. After preparation of the aqueous hydrosol dispersion, it is allowed to cool to room temperature and is preferably filtered by suitable means, such as through a piece of filter cloth or screen, to remove any small amounts of undispersed polymer which may be present.

The aqueous hydrosol dispersions of this invention are useful in the same manner as dispersions of the same terpolymers prepared by the solvent evaporation post-dispersion techniques taught in the aforementioned patent to Funck and Wolff and in my aforementioned patent. The hydrosol dispersions of this invention can be provided at lower cost than previous dispersions of these same terpolymers because of the simplicity of the process of this invention. These dispersions function in an outstanding manner as heat-seal coatings, laminating adhesives, and extrusion primers in applications on paper, foil, and film. Among their advantages are good adhesion to a wide range of substrates including polyethylene, polypropylene, Mylar®, and polyvinylidene chloride-coated paper and cellophane. Details for the use of ethylene terpolymers to prime substrates for extrusion coating are given in U.S. Pat. 3,573,125. Because of the development of ionic crosslinks, these fundamentally thermoplastic materials develop a degree of thermal resistance previously obtainable only with thermosetting adhesive formulations. In these applications dispersions having solids contents of about 2 to 35 percent by weight are suitable. In most applications the solids content is preferably about 10 to 30 percent.

EXAMPLES OF THE INVENTION

The following examples illustrating the preparation and use of the aqueous ethylene terpolymer hydrosol dispersions of this invention are given without any intention that the invention be limited thereto. All parts and percentages are by weight unless otherwise specified.

EXAMPLE 1

A terpolymer of ethylene/vinyl acetate/methacrylic acid (E/VA/MAA) of composition 67/28/5 and having a melt index of 46 was prepared by bulk polymerization. The resulting polymer was extruded and cut into small beads. To a twenty-gallon jacketed vessel equipped with a ½ H.P. portable propeller-type mixer were charged 18 pounds of the terpolymer beads, 6 pounds of dimerized wood rosin (Hercules Incorporated "Dymerex" resin) comprising approximately 80 percent rosin acid dimer and having a softening point of 152° C. as determined by the Hercules drop method and an acid number of 143, together with 0.5 pound of sodium hydroxide, 3 pounds of 28 percent $NH_3$ aqueous ammonium hydroxide, and 72 pounds of water. These quantities represent 50 percent neutralization of the acid groups of the polymer and the rosin with sodium hydroxide and 200 percent neutralization with ammonium hydroxide. The contents were heated with agitation to a temperature of 85° C. using hot water on the jacket of the vessel and held at this temperature for 5 hours. After cooling, an aqueous hydrosol was obtained which was a transparent brown liquid having a pH of 10.0 and a solids content of 24.4 percent. A small quantity (2–3 pounds) of undissolved or undispersed terpolymer beads was removed by screening.

This hydrosol was evaluated as an adhesive for laminating glassine paper to treated polypropylene and high-density polyethylene using application weights between 0.5 and 2 pounds per 300 square feet. It gave fiber-tearing bonds directly off the coating machine. The grease resistance and thermal delamination resistance were good and the appearance was equivalent to commercially produced sheets prepared using solvent-based laminating adhesives.

EXAMPLE 2

A quantity of the E/VA/MAA terpolymer of Example 1 was fractionated by density into three equal fractions which gave the following analysis:

| Fraction | Percent | |
|---|---|---|
| | VA | MAA |
| Light | 27.8 | 4.5 |
| Middle | 27.8 | 5.5 |
| Heavy | 28.3 | 5.7 |

One hundred and fifty grams of each fraction, together with 37.5 grams of a hydrogenated wood rosin (Hercules Incorporated "Staybelite" resin), 3.9 grams of NaOH, 22.5 grams of 28 percent $NH_3$ aqueous ammonium hydroxide, and 562.5 grams of water were placed in a 2-liter resin kettle and heated at 80–90° C. for 4 hours using mild agitation. The following results were obtained:

| | Light | Middle | Heavy |
|---|---|---|---|
| Solids content | 22.2 | 24 | 24 |
| Wt. undissolved polymer, g. | 26.5 | 1.1 | Trace |
| Yield of polymer to hydrosol, percent | 82 | 99+ | 99+ |

EXAMPLE 3

The following example illustrates the importance of having an alkali metal hydroxide in the formulation. One hundred and seventy-five grams of the terpolymer of Example 1, 75 grams of hydrogenated wood rosin, 30 grams of 28 percent ammonium hydroxide, and 750 grams of water were heated with agitation for 4 hours. The solids content of the liquid portion after this period was only 8.2 percent and consisted of a brittle solid when dried, indicating that only the wood rosin had been solubilized. At this point, 6.4 grams of sodium hydroxide were added which was sufficient to neutralize 50 percent of the acid groups. The resin dispersed to form a hydrosol upon stirring at 80–90° C. After thinning to 20.2 percent solids, only 4.2 grams of undispersed polymer remained, representing a 97.5 percent conversion of polymer to hydrosol.

EXAMPLE 4

The following example illustrates the use of potassium hydroxide and also the importance of an excess of an amine hydroxide. A quantity of 187.5 grams of the terpolymer of Example 1, 62.5 grams of hydrogenated wood rosin, 750 grams of water, 4.0 grams of potassium hydroxide, and 13.0 grams of 28 percent ammonium hydroxide was placed in a 2-liter vessel and heated to 80–90° C. for several hours. The KOH was equivalent to 25 percent neutralization of the acid groups and the $NH_4OH$ to 75 percent neutralization of the acid groups. The solids content of the resulting hydrosol was only 14.9, indicating that only approximately one-half of the resin had dispersed. An additional 12.0 grams of 28 percent $NH_4OH$ were added and agitation with heating was continued for another 4 hours. The hydrosol was cooled and screened, yielding 903 grams of product containing 22.4 percent solids. Thirty-two grams of undispersed resin were recovered, representing an 83 percent conversion.

EXAMPLE 5

The following example illustrates the use of an alkali metal hydroxide as the only base. A quantity of 187.5 grams of the terpolymer of Example 1, 62.5 grams of dimerized wood rosin, 750 grams of water, and 7.8 grams of sodium hydroxide were placed in a 2-liter vessel and agitated at 75–90° C. for 5 hours. The quantity of NaOH was sufficient to neutralize 50 percent of the acid groups. After cooling and screening, 951 grams of hydrosol containing 25.1 percent solids were obtained, leaving 20 grams of undispersed resin. This represents a 90 percent conversion.

EXAMPLE 6

The following example illustrates the importance of a rosin or fatty acid to aid in dispersing the terpolymer. A quantity of 250 grams of the terpolymer of Example 1, 50 grams of water, 100 grams of oleic acid, 20 grams of 28 percent ammonium hydroxide, and 4.36 grams of sodium hydroxide were added to a 2-liter vessel and heated at 80–90° C. with agitation. This quantity of NaOH is sufficient for 75 percent neutralization of the acid groups. The resin began to disperse at a temperature of 80–90° C., and in 45 minutes a hydrosol containing 18.9 percent solids was obtained.

For comparison, this example was repeated except that the oleic acid and ammonium hydroxide were omitted.

Agitation at 80–90° C. was continued for 2 hours. No dispersion or solution of any of the terpolymer occurred.

EXAMPLE 7

Two hundred twenty-five grams of ethylene terpolymer beads prepared by bulk polymerization having the composition E/VA/MAA, 75/18/7 and a melt index of 30, together with 75 grams of hydrogenated wood rosin, 700 grams of water, 5.5 grams of KOH, and 24 grams of 28 percent ammonium hydroxide were heated at 75–85° C. with agitation for 2½ hours. A portion of the terpolymer dispersed yielding a hydrosol of 19.2 percent solids content. This represents approximately a 60 percent conversion of the terpolymer to hydrosol.

EXAMPLE 8

Two hundred grams of ethylene terpolymer beads prepared by bulk polymerization having the composition of E/VA/MAA, 69/21/10 and a melt index of 12, together with 50 grams of hydrogenated wood rosin, 750 grams of water, 5.23 grams of NaOH, and 30 grams of 28 percent ammonium hydroxide were heated to 90–100° C. for 6 hours with agitation. The terpolymer dispersed to a hydrosol, and 200 grams of additional water were added before cooling to keep the product in a workable viscosity range. The solids content of the hydrosol was 20 percent, and on filtration through a 200-mesh screen only 6 grams (dry weight) of undispersed resin was removed representing a 97 percent conversion to the hydrosol. This hydrosol gave fiber-tearing bonds when evaluated as a film/paper laminating adhesive.

For comparison and to show the criticality of having at least 3 percent acid in the terpolymer, the above example was repeated except that an ethylene terpolymer having the composition E/VA/MAA, 72.7/25.2/2.1 and a melt index of 24.8 was used. After heating at 90–100° C. for 5 hours, the polymer beads showed no signs of dispersing. The recovered polymer beads, after filtration and drying, weighed 209 grams. The increase in weight is attributed to absorption of some of the wood rosin by the polymer.

For further comparison and to show the criticality of having no more than 80 percent ethylene in the terpolymer, the above example was again repeated using an ethylene terpolymer having the composition E/VA/MAA, 85/12/5 and a melt index of 3. After heating at 80–90° C. for 5 hours, none of the resin dispersed, the beads retaining their original size and shape. The recovered beads, after filtration and drying, weighed 206.5 grams, the increase in weight again being attributed to absorption of a small portion of the wood rosin.

EXAMPLES 9–13

The procedure of Example 8 was repeated using a variety of terpolymers containing methyl methacrylate (MMA), isobutylacrylate (IBA), and vinyl acetate (VA) as the ester monomer. The composition of each of the terpolymers and the results are listed in the table. In Example 10, 7.0 grams of NaOH were used instead of 5.23 grams. In Example 13 the product thickened on cooling and an additional 200 grams of water were added to reduce the viscosity.

| Ex. | Terpolymer | | | | Percent | | |
|---|---|---|---|---|---|---|---|
| | Ester | | Percent MAA | M.I. | Acid Na+ neut. | Solids of hydrosol | Conv. to hydroso |
| | Type | Percent | | | | | |
| 9 | MMA | 20 | 5 | 18 | 50 | 21.0 | 81 |
| 10 | IBA | 10 | 10 | 35 | 50 | 23.2 | 83.5 |
| 11 | IBA | 16 | 5 | 41 | 50 | 20.4 | 70.5 |
| 12 | IBA | 37.3 | 3.2 | 3.0 | 59 | 19.9 | 67.0 |
| 13 | VA | 36.7 | 4.0 | 57 | 54 | 20.1 | 98 |

EXAMPLE 14

Two hundred grams of an ethylene terpolymer of composition ethylene/vinyl acetate/acrylic acid, 70.8/24.0/5.2, and having a melt index of 26, together with 50 grams of hydrogenated wood rosin, 750 grams of water, 5.23 grams of NaOH, and 30 grams of 28 percent ammonium hydroxide were heated for 4 hours at a temperature of 90° C. This quantity of NaOH is sufficient to neutralize 45 percent of the acid groups in the copolymer and the rosin acid. The terpolymer dispersed to a viscous hydrosol to which 150 grams of additional water were added before cooling. The solids content of the product was 20 percent and it has a Brookfield viscosity of 3100 centiposes (No. 4 spindle, 60 r.p.m.). On filtration through a 200-mesh screen, 20.5 grams (dry weight) of undispersed resin were removed. This represents a 90 percent conversion of the terpolymer to hydrosol.

Although the invention has been described and exemplified by way of specific embodiments, it is not intended that it be limited thereto. As will be apparent to those skilled in the art, numerous modification and variations of these embodiments can be made without departing from the spirit of the invention or the scope of the following claims.

What is claimed is:

1. An aqueous ethylene terpolymer hydrosol dispersion containing particles smaller than about 0.08 micron which comprises
   (1) an ethylene terpolymer consisting essentially of 55 to 80 weight percent alpha, beta-ethylenically unsaturated carboxylic acid taken from the group consisting of acrylic acid, methacrylic acid, crotonic acid, fumaric acid, maleic acid, itaconic acid, aconitic acid, maleic anhydride, itaconic anhydride, alkyl hydrogen maleates and alkyl hydrogen fumarates wherein alkyl is of 1 to 6 carbon atoms;
   (2) 5 to 50 weight percent, based on the ethylene terpolymer, high molecular weight acid selected from the group consisting of wood and tall oil rosins, modified rosins which have been chemically treated by hydrogenation, dehydrogenation or polymerization, and fatty acids of 12 to 18 carbon atoms and having an acid number of at least 50;
   (3) alkali metal hydroxide in an amount equivalent to 10 to 100 percent of the acid groups in both the ethylene terpolymer and the high molecular weight acid; and
   (4) amine base having a dissociation constant of at least $1 \times 10^{-8}$ in an amount equivalent to 0 to 300 percent of the acid groups in both the ethylene terpolymer and the high molecular weight acid,
the total amount of alkali metal hydroxide and amine base being sufficient to neutralize at least 50 percent of the acid groups in both the ethylene terpolymer and the high molecular weight acid, said hydrosol having a solids content of 2 to 35 percent by weight solely in water.

2. The aqueous hydrosol dispersion of Claim 1 in which the high molecular weight acid is rosin having an acid number of at least about 50.

3. The aqueous hydrosol dispersion of Claim 2 in which at least 60 percent of the acid groups in the ethylene terpolymer are neutralized.

4. The aqueous hydrosol dispersion of Claim 3 in which the ethylene terpolymer consists essentially of 65 to 75 weight percent ethylene, 15 to 30 weight percent vinyl acetate and 5 to 10 weight percent ethylenically unsaturated carboxylic acid selected from the group consisting of acrylic acid and methacrylic acid.

5. The aqueous hydrosol dispersion of Claim 4 in which the solids content is 10 to 30 percent by weight.

6. The aqueous hydrosol dispersion of Claim 5 in which the rosin is present in the amount of 20 to 30 percent by weight, based on the ethylene terpolymer and the alkali metal hydroxide is present in an amount sufficient to neutralize 25 to 60 percent of both acid groups.

7. The aqueous hydrosol dispersion of Claim 6 in which the rosin is dimerized wood rosin.

8. A method of preparing aqueous ethylene terpolymer hydrosol dispersions containing particles smaller than about 0.08 micron without the aid of a volatile solvent which comprises (A) mixing
  (1) an ethylene terpolymer consisting essentially of 55 to 80 weight percent alpha, beta-ethylenically unsaturated carboxylic acid taken from the group consisting of acrylic acid, methacrylic acid, crotonic acid, fumaric acid, maleic acid, itaconic acid, aconitic acid, maleic anhydride, itaconic anhydride, alkyl hydrogen maleates and alkyl hydrogen fumarates wherein alkyl is of 1 to 6 carbon toms;
  (2) 5 to 50 weight percent, based on the ethylene terpolymer, high molecular weight acid selected from the group consisting of wood and tall oil rosins, modified rosins which have been chemically treated by hydrogenation, dehydrogenation or polymerization, and fatty acids of 12 to 18 carbon atoms and having an acid number of at least 50;
  (3) alkali metal hydroxide in an amount equivalent to 10 to 100 percent of the acid groups in both the ethylene terpolymer and the high molecular weight acid; and
  (4) amine base having a dissociation constant of at least $1 \times 10^{-8}$ in an amount equivalent to 0 to 300 percent of the acid groups in both the ethylene terpolymer and the high molecular weight acid, the total amount of alkali metal hydroxide and amine base being sufficient to neutralize at least 50 percent of the acid groups in both the ethylene terpolymer and the high molecular weight acid; and (5) water in an amount sufficient to provide a solids content of 2 to 35 percent by weight, and (B) heating this mixture at a temperature of 55 to 140° C. with agitation for a period of time sufficient to convert the mixture to an aqueous hydrosol dispersion.

9. The method of Claim 8 in which the temperature is 65 to 100° C.

10. The method of Claim 9 in which the temperature is 80 to 95° C.

11. The method of Claim 9 in which the mixture is heated for a period of from 15 minutes to 4 hours.

12. The method of Claim 8 in which the alpha, beta-ethylenically unsaturated carboxylic acid is acrylic acid.

13. The method of Claim 8 in which the alpha, beta-ethylenically unsaturated carboxylic acid is methacrylic acid.

14. The aqueous hydrosol dispersion of Claim 1 in which the alpha, beta-ethylenically unsaturated carboxylic acid is acrylic acid.

15. The aqueous hydrosol dispersion of Claim 1 in which the alpha, beta-ethylenically unsaturated carboxylic acid is methacrylic acid.

16. The aqueous hydrosol dispersion of Claim 2 in which the rosin is wood rosin.

17. The aqueous hydrosol dispersion of Claim 2 in which the rosin is tall oil rosin.

References Cited

UNITED STATES PATENTS

| | | | |
|---|---|---|---|
| 3,677,989 | 7/1972 | Jenkinson | 260—29.6 H |
| 3,296,172 | 1/1967 | Funck et al. | 260—29.6 |
| 3,487,036 | 12/1969 | Bissot | 260—27 R |
| 3,352,817 | 11/1967 | Meyer | 260—94.9 |

HOSEA E. TAYLOR, Primary Examiner

W. E. PARKER, Assistant Examiner

U.S. Cl. X.R.

260—29.6 PM, 31.2 R, 80.73

PO-1050
(5/69)

UNITED STATES PATENT OFFICE
CERTIFICATE OF CORRECTION

Patent No. 3,823,108                Dated July 9, 1974

Inventor(s)  Thomas Charles Bissot

It is certified that error appears in the above-identified patent and that said Letters Patent are hereby corrected as shown below:

Column 3, line 58, "pressue" should be -- pressure --.

Column 8, line 26, Claim 1, between "percent" and "alpha" should be inserted -- ethylene, 10 to 42 weight percent ester monomer and 3 to 10 weight percent --.

Column 9, line 5, Claim 8, between "percent" and "alpha" should be inserted -- ethylene, 10 to 42 weight percent ester monomer and 3 to 10 weight percent --; Line 12, "toms" should read -- atoms --.

Signed and sealed this 19th day of November 1974.

(SEAL)
Attest:

McCOY M. GIBSON JR.
Attesting Officer

C. MARSHALL DANN
Commissioner of Patents